United States Patent [19]

Marocco

[11] 3,904,168

[45] Sept. 9, 1975

[54] ELECTRO-MAGNETICAL FLUID FLOW CONTROL VALVE WITH DIFFERENTIAL ACTION

[75] Inventor: Antonio Marocco, Arma Di Taggia, Italy

[73] Assignee: Elge Establishment, Mauren, Liechtenstein

[22] Filed: Apr. 23, 1974

[21] Appl. No.: 463,235

[30] Foreign Application Priority Data
Apr. 27, 1973 Italy................................ 68185/73

[52] U.S. Cl.................................... 251/30; 251/45
[51] Int. Cl.² ................ F16K 31/40; F16K 31/385
[58] Field of Search........................ 251/45, 30, 38

[56] References Cited
UNITED STATES PATENTS

| | | | |
|---|---|---|---|
| 1,643,500 | 9/1927 | Jacobson et al. | 251/45 |
| 3,476,353 | 11/1969 | Stampfli | 251/45 |

Primary Examiner—Arnold Rosenthal
Attorney, Agent, or Firm—Sughrue, Rothwell, Mion, Zinn & Macpeak

[57] ABSTRACT

An electromagnetically controlled differential action fluid flow control valve of the type comprising a valve body in which there are formed two concentric chambers respectively connected to an inlet and an outlet of the valve; a disc-type valve shutter is movable between two positions selectively to permit or prevent communication between the two chambers and is moved between the two positions by the pressure differential across a diaphragm connected to the shutter and separating a pilot chamber from the outer of the two concentric chambers. The pressure differential is varied by means of an electromagnet controlling an outlet from the pilot chamber. The pilot chamber communicates with the outer of the said two chambers by means of an axial passageway which passes through an outer fixed part of the diaphragm or through a radial projection extending from the outer part of the diaphragm.

6 Claims, 15 Drawing Figures

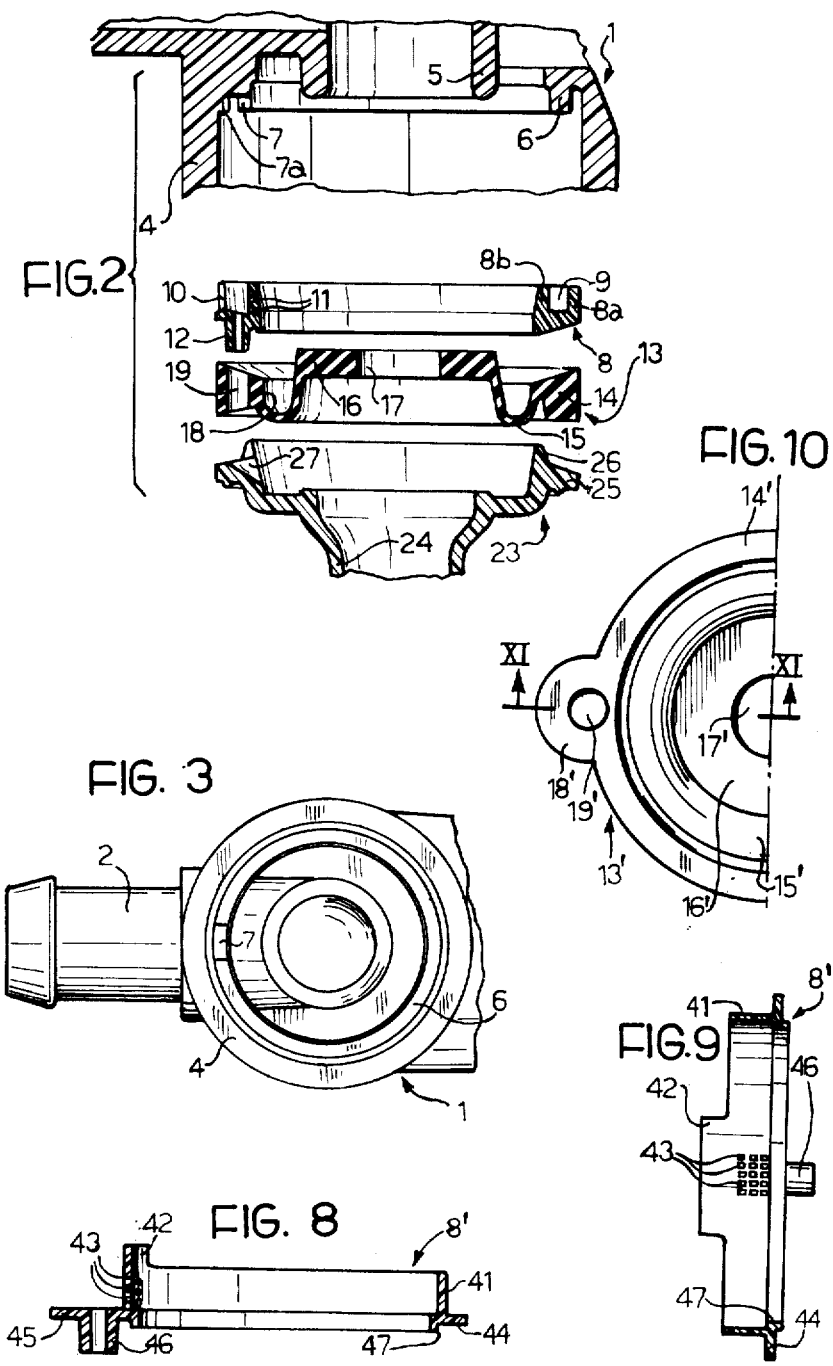

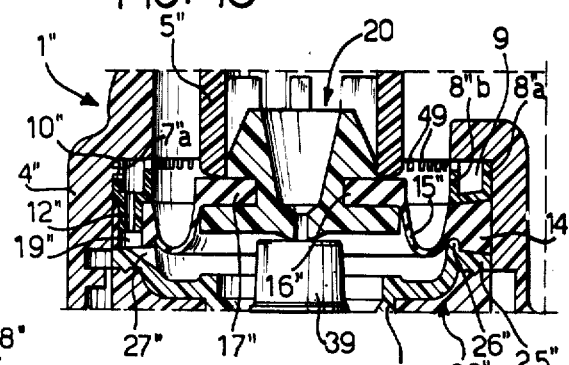
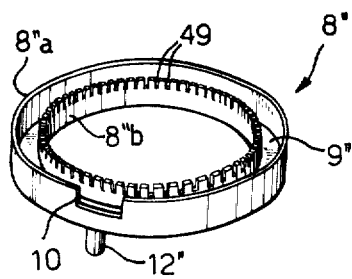
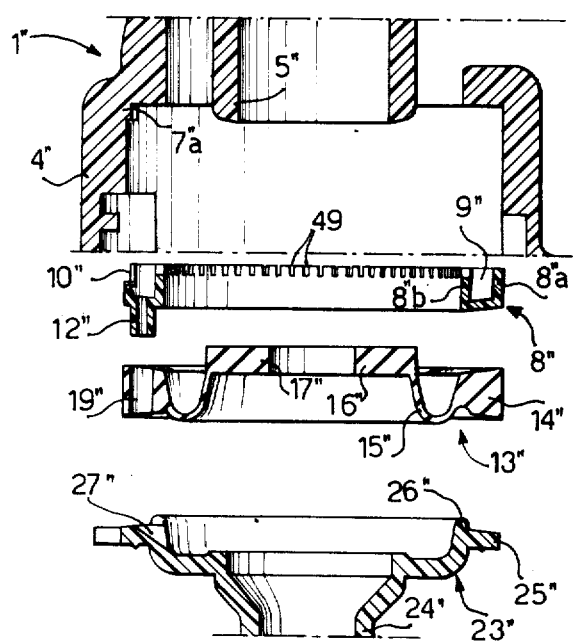

ELECTRO-MAGNETICAL FLUID FLOW CONTROL VALVE WITH DIFFERENTIAL ACTION

The present invention relates to electromagnetically operated fluid flow control valves having a differential action, and particularly to valves of the type which are normally closed to the passage of fluid and open only when the electromagnet is energised.

One known type of such electromagnetically operated valves has a first, outer, annular chamber, communicating with a fluid inlet, a second chamber positioned coaxially within the first chamber and communicating with the first chamber and with a fluid outlet, and a flat disc-like valve shutter, arranged coaxially with and opposite to the two chambers, the shutter being axially movable so that in one position it blocks the communication between the two chambers, and in another position it permits communication between the two chambers. The shutter is associated with a resiliently deformable diaphragm, which is tightly secured at its periphery to the body of the valve, separating the first and second coaxial chambers from a pilot chamber which is situated on the side of the shutter remote from the first and second coaxial chambers and to which is fed a control pressure the value of which, in relation to the value of the pressure acting on the opposite face of the shutter, determines whether the valve is to close or open.

In the diaphragm or in the movable shutter there is a calibrated opening through which fluid arriving at the outer or inlet chamber can flow into the pilot chamber so as to create therein a pressure the absolute value of which can, at most, be equal to the working pressure of the fluid; the rear surface area of the diaphragm that is the area thereof facing the pilot chamber, and the front surface area of the shutter, that is the surface area facing the first and second chambers, upon which the pressure acts are different, and this causes a resultant thrust which moves the shutter to the closure position. The pilot chamber can be put in communication with a discharge orifice which has a diameter greater than that of the inlet opening, so that the pressure on the front face of the shutter causes it to shift towards the open position, thereby allowing communication between the first and second chambers and thus permitting fluid to flow from the inlet to the outlet through the valve. The position of a movable core of an electromagnet controls the opening and closing of the discharge orifice of the pilot chamber, through which fluid entering the pilot chamber can leave it.

In the rest position the movable core of the electromagnet is resiliently biased to a position where it closes the discharge orifice of the pilot chamber so that fluid entering through the inlet maintains the pilot chamber at the maximum value determined by the working pressure and the shutter remains in the closed position, blocking communication between the first and second chambers and preventing the passage of fluid through the valve. When the electromagnet is energised the core moves to open the discharge orifice so that the pressure in the pilot chamber falls and the pressure acting on the front face of the shutter causes it to move away from the valve seat, thereby allowing the passage of fluid through the valve.

Differential action valves of this type, are known; in the known valves, the calibrated opening into the pilot chamber from the outer annular chamber is formed in an annular thin part of the diaphragm, between an outer annular part of relatively greater thickness by means of which the diaphragm is sealed tightly to the body of the valve, and a central part of relatively greater thickness to which the shutter is fixed; the annular thin part is resiliently deformed each time the shutter moves in one direction or the other; preferably it has a U-shape axial section so as to "roll" by relative movement of the two arms of the U as the diaphragm is deformed.

It is generally necessary to provide a plurality of such calibrated openings in this thin part of the diaphragm, in order to permit sufficient fluid to flow into the pilot chamber, due to the difficulty of making openings of a predetermined diameter in a sheet of resilient elastomeric material the thickness of which is of the order of only a few tenths of a millimetre. These openings are a source of unreliability in the valves, however, as they weaken the thin, resiliently deformable, part of the diaphragm, thereby promoting the start of cracks or breakages after the valve has been in use for some time.

In order to avoid this disadvantage and to render such valves more reliable, it has been proposed to form the calibrated inlet opening directly in the rigid body of the shutter in an eccentric position with respect to the axis of the shutter body. Since such an opening must be positioned so as to communicate readily with the annular outer inlet chamber, which is connected with the fluid inlet, this entails the use of large diameter components for the diaphragm and shutter which deleteriously affects the general dimensioning of the valve.

For reliability of operation of such differential action valves it is essential for the calibrated fluid inlet opening into the pilot chamber to remain absolutely free and unobstructed. Even partial obstruction of this opening would alter the cross section of the fluid passage and would cause anomalies in operation; total obstruction of this opening would, of course, make the valve totally inoperative, preventing the shutter from being closed.

It is therefore required to provide such valves with means for avoiding obstruction of the calibrated inlet opening to the pilot chamber by particles carried by the fluid, which particles could have passed through a filter which would normally be situated at the inlet. For this reason it has been proposed to form the calibrated inlet opening to the pilot chamber in the rigid body of the shutter in such a way that, rather then opening directly in the front face of the shutter, it communicates by means of internal paths with a plurality of filtering orifices in that face, so as to reduce the probability of complete interruption of the passage of fluid to the pilot chamber. This arrangement, however, renders the construction of the shutter complex and costly since it would then have to be made in several pieces, and also, still necessitates the use of large diameters as the filtering orifices must be located in positions which are eccentric with respect to the axis of the shutter in order to communicate with the outer annular chamber.

The present invention seeks to provide an electromagnetically operated valve in which the above mentioned disadvantages and limitations of known differential action electromagnetic valves are, at least to a large extent, overcome. It is a feature of the present invention that embodiments thereof can be constructed which have equally good performance characteristics, that is in respect of fluid delivery rates, as known differential action electromagnetically operated valves, but which are smaller than the known valves and which have a greater reliability of operation due to the fact that the risk of a blockage in the calibrated inlet opening to the pilot chamber is substantially eliminated.

According to the present invention, there is provided an electromagnetically operated fluid flow control valve with differential action, of the type comprising a valve body having an inlet and an outlet and in which there are provided an outer annular chamber communicating with the inlet, an inner chamber coaxial with the outer chamber and communicating with the outlet, a disk-like valve shutter positioned coaxially at one end of the two chambers and movable axially thereof between a first position in which it interrupts communication between the two chambers, and a second position in which it allows communication between the two chambers, a diaphragm of resilient material having an outer annular part tightly secured at its periphery to the valve body, a flexible intermediate annular part the thickness of which is less than that of the outer annular part and a central part which is thicker than the intermediate part and which is fixed to the shutter, the diaphragm separating the said coaxial inner and outer chambers from a pilot chamber which is formed between the diaphragm and a fixed lower insert element housed by the valve body, the pilot chamber communicating with the annular outer chamber via a communication passageway and having a discharge opening which communicates with the outlet and which is closable by an axially movable core actuated by an electromagnet, in which the communication passageway between the annular outer chamber and the pilot chamber is formed by an axial conduit located radially outwardly of the annular flexible intermediate part of the diaphragm, the conduit communicating at one end with the pilot chamber through a radial opening in the said fixed lower insert element which forms one wall of the pilot chamber, and communicating at the other end with the annular outer chamber via an intermediate chamber separated from the said annular outer chamber by a wall having a plurality of filtering orifices passing therethrough.

Embodiments of the invention will now be more particularly described, by way of example, with reference to the accompanying drawings, in which:

FIG. 2 is an exploded axial section of part of the valve of FIG. 1;

FIG. 3 is a partial plan view from above of the main body of the valve of FIG. 1;

FIGS. 8 and 9 are two axial sections of the valve of FIG. 6, taken respectively along the lines VIII—VIII and IX—IX of FIG. 7;

FIG. 10 is a plan view of the diaphragm which forms part of the valve of FIG. 6;

FIG. 13 is a partial axial section of a third embodiment of electromagnetically operated valve;

FIG. 14 is an exploded axial section illustrating part of the valve shown in FIG. 13; and FIG. 15 is a perspective view of one of the members of the valve shown in FIGS. 13 and 14.

Figure 1:
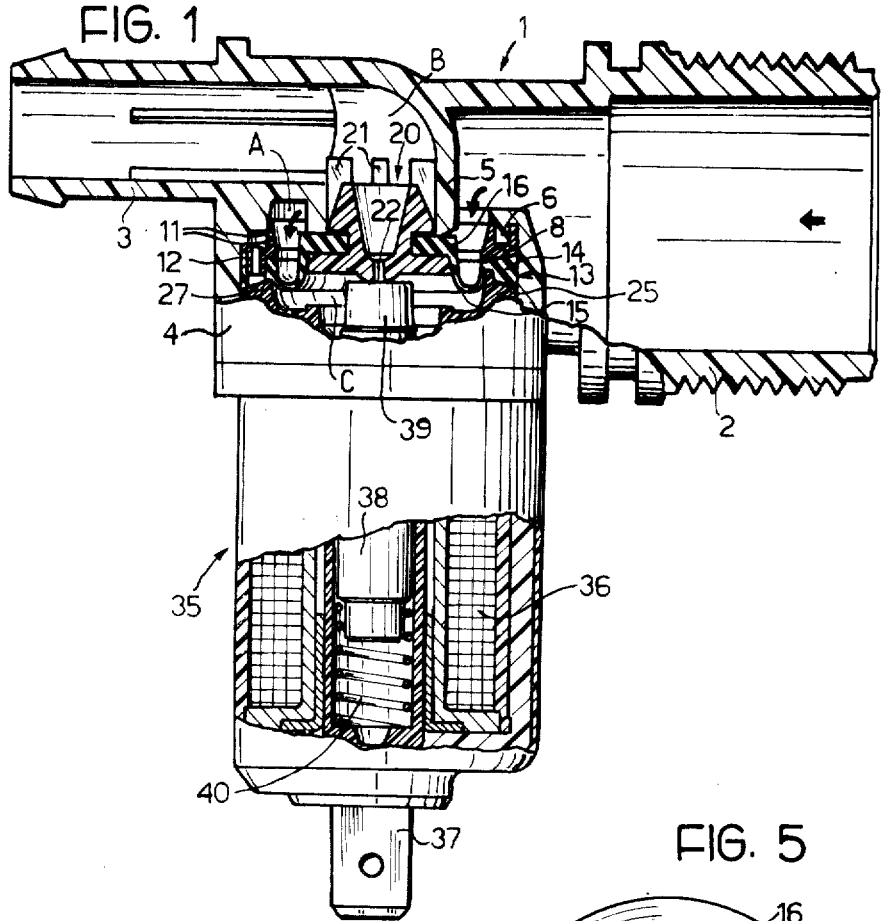
FIG. 1 is an axial section of a differential action electromagnetically operated valve formed as one embodiment of this invention, shown in the closed position.
Figure 4:
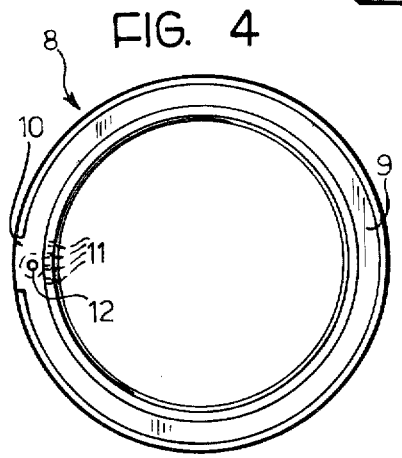
FIG. 4 is a plan view from above, of one of the elements forming the valve of FIG. 1.
Figure 5:
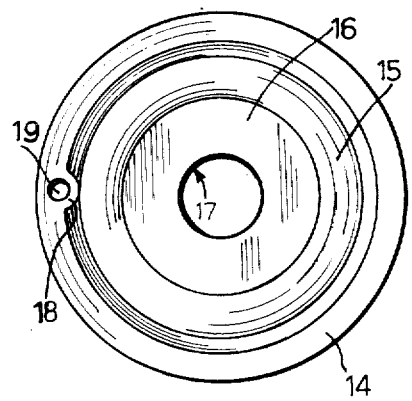
FIG. 5 is a plan view of the diaphragm forming part of the valve of FIG. 1.
Figure 6:
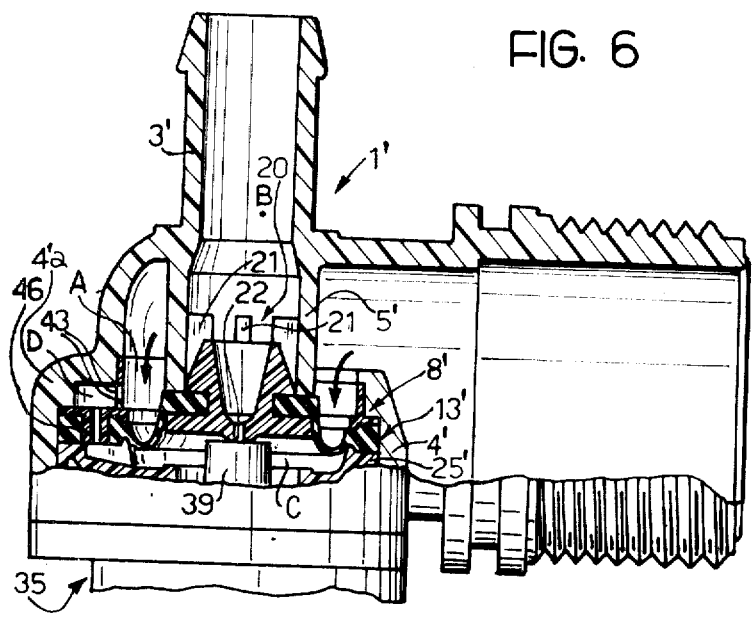
FIG. 6 is a partial axial section of a second embodiment of an electromagnetically operated valve.

Referring now to FIGS. 1 to 5, there is shown a main body 1 of an electromagnetically operated valve formed as an embodiment of this invention; the body 1 is made of plastics material and has a threaded inlet connector 2, and an outlet connector 3, which may be axially aligned with the inlet connector as shown in the drawings, or alternatively positioned at 90° with respect thereto. The body 1 also has a lower outer, tubular part 4 inside which is a coaxial tubular part 5 of smaller diameter which is connected to the outlet connector 3 and defines an inner chamber B which communicates with the outlet connector 3. The two tubular parts 4 and 5 define between them an outer annular chamber A, which communicates with the inlet connector 2, and is coaxial with the inner chamber B defined by the inner tubular part 5.

The outer tubular part 4 has at the top an inwardly directed flange from which projects an inner, axially extending annular ridge 6 against which abuts an upper annular insert elements 8, also of plastics material, having an upper annular groove 9 into which fits the ridge 6. The annular insert element 8 (see FIGS. 2 and 4) has a radial notch 10 interrupting the continuity of its outer wall; in circumferential alignment with the notch 10 the internal wall of the annular element 8 has a plurality of filtering openings 11. At the same circumferential position as the notch 10 and openings 11 the upper insert element 8 has an axial tubular projection 12 extending downwardly. Upon assembly, the element 8 is inserted into the outer tubular part 4 in such a way that its inner wall forms part of the annular chamber A; the notch 10 engages with a projection 7a of the body 1 so that the element 8 is positioned with the openings 11 adjacent an axial cavity 7 of the annular ridge 6 of the body 1, which forms a radial passage which communicates with the outer annular chamber A through the filtering openings 11.

Underneath the upper annular insert element 8 there is located a diaphragm 13 of elastomeric material which comprises a relatively thick outer annular part 14, a thinner intermediate flexible annular part 15 which is deformable by rolling, and a relatively thick central part 16 having a central axial opening 17 in which engages a rigid element 20, constituting the shutter of the valve, having axial fins 21 which guide it along the tubular part 5 of the body. The element 20 also has a central axial opening 22. The thick outer annular part 14 of the diaphragm 13 has a radial swelling 18 (see FIG. 5) in which there is an axial opening 19 through which extends the tubular axial projection 12 of the annular insert element 8 when the valve is assembled.

On the side of the diaphragm 13 opposite the upper insert element 8 there is a lower insert element 23 having a moulded outer radial flange 25 and an axial ridge 26. The flange 25 is connected by an annular radial web to an axially extending tubular portion 24, which projects downwardly and is closed at the bottom. The lower insert element 23 forms the bottom of a pilot chamber C which is closed at the top by the deformable diaphragm 13 and by the shutter 20. In alignment with the tubular projection 12 of the annular element 8 the flange 25 of the element 23 has a radial opening 27 allowing entry of the fluid into the pilot chamber C.

Thus fluid from the outer annular chamber A, which communicates with the inlet connector 2, can pass to the pilot chamber C through a series of conduits formed by the cavity 7 of the annular ridge 6 of the tubular portion 4 of the body 1, the axial bore of the tubular projection 12 of the annular upper element 8, and the opening 27 in the flange 25 of the lower element 23. The axial bore of the tubular projection 12 of the element 8 constitutes a calibrated passageway located at a position spaced radially outwardly from the intermediate flexible annular part 15 of the diaphragm 13. This makes possible a substantial reduction in the diameters of the chambers, thereby proportionately reducing the overall dimensions of the valve as a whole.

The body 1 of the valve is fitted in a known way to a casing 35 incorporating an electromagnet 36 and carrying at the base two flat contact pins 37. The casing 35 has an inner axial cavity into which extends the tubular part 24 of the flanged lower element 23. Inside the tubular part 24 there is housed an axially movable core 38 with a spring 40 between the lower part thereof and the closed bottom of the tubular part 24. The top of the core 38 carries a hood 39 of elastomeric material which, when the electromagnet is not energised and the shutter is biased upwardly by the spring 40, closes the central opening 22 of the shutter 20 thereby closing communication between the pilot chamber C and the outlet chamber B.

FIGS. 6 to 12 show a second embodiment of an electromagnetically operated valve according to the invention which generally resembles the embodiment of FIGS. 1 to 5 as far as the main features are concerned. These features will be referred to with the same reference numerals as used in FIGS. 1 to 5 and will not be separately described. In FIGS. 6 to 12 there is shown a valve body 1' which is provided with an inlet connector 2', and outlet connector 3', and a tubular part 4' which has a hollow radial protuberance 4'a. Within the tubular part 4' there is housed an annular element 8', shown in greater detail in FIGS. 7 to 9, which has an outer, axial, tubular part 41 a portion 42 of the wall of which is of greater height and through which there are provided a plurality of filtering openings 43. From the tubular part 41 there extends a radial flange 44 having a radial protuberance 45 which supports an axial tubular projection 46 which extends downwardly. The tubular part 41 also has an internal annular radial ridge 47. Upon assembly the tubular part 41 of the element 8 forms parts of the wall of the annular outer chamber A and the filtering openings 43 are positioned in correspondence with the protuberance 4'a of the valve body 1'.

Figure 11:
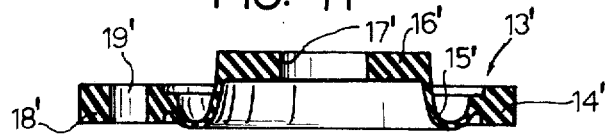
FIG. 11 is an axial section of the diaphragm, taken on the line XI—XI of FIG. 10.

Against the annular element 8' is pressed a diaphragm 13' of elastomeric material, which is shown in greater detail in FIGS. 10 and 11. The diaphragm 13' comprises a relatively thick outer annular portion 14', a relatively thin flexible intermediate annular portion 15', and a relatively thick central portion 16' through which extends an opening 17' into which engages a rigid shutter 20.

The outer annular portion 14' has a radial projection 18' with an axial opening 19' through which extends the tubular projection 46 of the annular element 8'.

Figure 12:
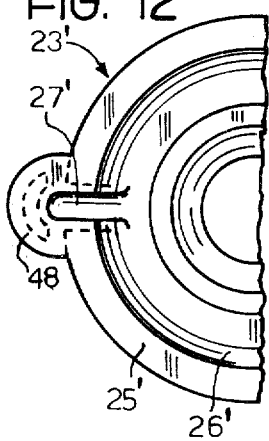
FIG. 12 is a plan view of another element of the valve of FIG. 6.
Figure 7:
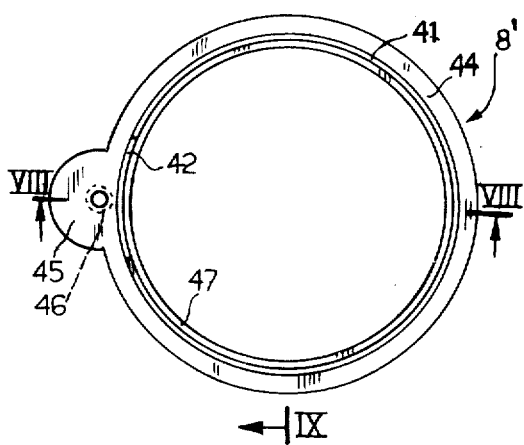
FIG. 7 is a plan view of one of the elements of the valve shown in FIG. 6.

The diaphragm 13 is pressed against the annular element 8' by an annular flange 25' of a flanged element 23', shown in FIG. 12, which comprises a tubular part 24' similar to the part 24 of the embodiment of FIGS. 1 to 5, the part 24' is closed at the base and there is an upper annular projection 26' extending from the flange 25' and interrupted by a radial notch forming part of an opening 27'. From the flange 25' extends a radial projection 48 in which there is a radial cavity communicating with the notch and also forming part of the opening 27'. This radial cavity is positioned upon assembly adjacent the tubular projection 46 of the annular element 8' to allow passage of the fluid from the annular chamber A which communicates with the inlet conduit to the pilot chamber C which, in this embodiment, is delimited by the diaphragm 13' and by the flange 25' of the flanged element 23'. The radial projection 18' of the diaphragm 13' and the projection 48 of the flanged element 23' are positioned in the internal cavity of the protuberance 4'a of the body 1'.

The remaining parts of the valve are similar to those hereinbefore described with reference to FIGS. 1 to 5. In this embodiment fluid passes from the outer annular chamber A to the pilot chamber C through an axial conduit situated outside the outer annular portion 14' of the diaphragm 13' and passing through the opening in the radial projection thereof. This axial conduit, which is constituted by the bore in the tubular axial projection 46 of the element 8', communicates at the top with a space D provided in the protuberance 4'a of the valve body 1', and this space D in its turn, communicates with the outer chamber A through the filtering openings 43 in the tubular axial part of the element 8'. The conduit formed by the tubular axial projection 46 of the element 8' also communicates with the pilot chamber C through the radial opening 27' formed by the notch in the flange 25' of the flanged element 23' and the cavity in the radial projection 48 thereof. Obstruction of the calibrated conduit is prevented in this embodiment, as in the embodiment of FIGS. 1 to 5, by the presence of a plurality of filtering orifices situated upstream of the conduit.

FIGS. 13 to 15 illustrate a third embodiment of the invention which is further simplified. In this embodiment the cavity of a cylindrical tubular part 4'' of a valve body 1'' houses a tightly inserted annular U-section element 8'' the outer wall 8''a of which has a notch 10'' suitable for cooperating with a positioning projection 7''a of the body 1'' and the inner wall 8''b of which has on its upper edge a plurality of radial notches 49 forming a circle of filtering apertures which retain any particles which may be drawn along by the fluid.

As in the first embodiment, the element 8'' has a tubular projection 12' which is inserted into an axial opening 19'' in an outer relatively thick part 14'' of a diaphragm 13'' of elastomeric material which is trapped between the element 8'' and a flange 25'' of a lower flanged element 23''. The diameter of the calibrated opening of the projection 12'' is greater than the size of the notches 49 so that it will not be blocked by any particles which might pass through those notches.

The fluid passes to the pilot chamber C through the notches 49, the annular groove 9'' of the element 8'', the central bore of the tubular appendage 12'' and the radial notch 27'' of the flanged element 23''.

The calibrated conduit carrying fluid into the pilot chamber may alternatively be formed in an auxiliary sealed element, coupled to the diaphragm or formed directly in the thickness of the main valve body.

I claim:

1. In a electromagnetically operated differential action fluid flow control valve of the type comprising:

a valve body, an inlet to the valve body, an outlet from the valve body, an outer annular chamber communicating with said inlet, an inner chamber coaxial with said outer annular chamber and communicating with said outlet, a disc-like valve shutter located coaxially at one end of said inner and outer chambers, said valve shutter being movable axially of said chambers between a first position where it interrupts communication between said inner and outer chambers and a second position where it permits communication between said inner and outer chambers, a diaphragm of resilient material, said diaphragm comprising:

an outer annular part, an intermediate annular part the thickness of which is less than that of said outer annular part, said intermediate annular part being resiliently deformable, and a central part of the thickness of which is greater than that of said intermediate annular part, means tightly securing said outer annular part at its periphery to said valve body, a fixed lower insert element housed in said valve body and defining a cavity in said valve body with which said diaphragm cooperates to define a pilot chamber separated by said diaphragm from said inner and outer coaxial chambers, means defining a communication passageway between said pilot chamber and said outer annular chamber, means defining a discharge opening between said pilot chamber and said outlet of said valve body, and an axially movable electromagnet core the position of which is controlled by an electromagnet to close or open said discharge opening of said pilot chamber, the improvement wherein said communication passageway between said annular outer chamber and said pilot chamber is formed by an axial conduit loacted radially outwardly of said annular flexible intermediate part of said diaphragm, there being means defining a radial opening in said fixed lower insert element which forms one wall of said pilot chamber, said radial opening communicating with one end of said communication conduit, means defining an intermediate chamber communicating with the other end of said communication conduit, a wall having a plurality of filtering orifices therein separating said intermediate chamber from said annular outer chamber and an annular upper insert element having a tubular axial projection extending therefrom, said axial projection forming at least part of said axial communication conduit between said annular outer chamber and said pilot chamber, said annular upper insert element forming part of the wall of said annular outer chamber and engaging said outer annular part of said diaphragm, a plurality of openings in one wall of said annular upper insert element forming said filtering orifices permitting communication between said annular outer chamber and said intermediate chamber.

2. The electromagnetically operated fluid flow control valve of claim 1 wherein said annular upper insert element has a radially extending base from which said tubular projection extends.

3. The electromagnetically operated fluid flow control valve of claim 1 wherein said annular upper insert element has a radial projection extending from a radial flange thereof and said tubular axial projection extends from said radial projection.

4. The electromagnetically operated fluid flow control valve of claim 1 wherein said annular upper insert element has an upper annular groove, an annular ridge on said valve body, said annular ridge engaging within said annular groove of said upper insert element, a notch in said annular ridge forming, with the surrounding part of said annular groove, said intermediate chamber for said fluid, a plurality of openings in said radially inner wall of said annular groove in said upper insert element forming said filtering orifices, and an opening in the bottom wall of said annular groove providing communication between said intermediate chamber and said axial communication conduit which extends from said upper insert element.

5. The electromagnetically operated fluid flow control valve of claim 1 wherein said annular upper insert element comprises:

a tubular wall part, a radial flange on said tubular wall part, a cavity in said valve body forming said intermediate chamber, a perforated section of said tubular wall part of said upper insert element separating said intermediate chamber from said annular outer chamber, said radial flange of said upper insert element forming one end wall of said annular outer chamber, a radial projection from said radial flange of said upper insert element, said tubular projection of said upper insert element extending from said radial projection thereof and forming said axial communication conduit.

6. The electromagnetically operated fluid flow control valve of claim 1 wherein said upper insert element has an annular groove therein forming said intermediate chamber, the bottom of said annular groove communicating with said axial communication conduit, notches in the radially inner wall of said annular groove in said upper insert element, said notches forming said filtering orifices permitting fluid to flow from said annular outer chamber in to said intermediate chamber.

* * * * *